United States Patent
Bennin et al.

(10) Patent No.: US 7,177,119 B1
(45) Date of Patent: Feb. 13, 2007

(54) MICROACTUATED HEAD SUSPENSION WITH RING SPRINGS

(75) Inventors: Jeffry S. Bennin, Hutchinson, MN (US); Wade A. Linnertz, Chanhassen, MN (US); Jason R. Heffelfinger, Arden Hills, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 10/012,260

(22) Filed: Dec. 5, 2001

Related U.S. Application Data

(60) Provisional application No. 60/251,412, filed on Dec. 5, 2000.

(51) Int. Cl.
  G11B 21/24 (2006.01)
  G11B 5/56 (2006.01)

(52) U.S. Cl. .................................................. 360/294.6
(58) Field of Classification Search ............. 360/264.5, 360/294.6, 244.5, 244.8, 266.1, 265.9, 244.2
  See application file for complete search history.

(56) References Cited

U.S. PATENT DOCUMENTS

| | | | | |
|---|---|---|---|---|
| 5,283,704 A | * | 2/1994 | Reidenbach ............. | 360/264.3 |
| 5,495,375 A | * | 2/1996 | Baasch et al. ........... | 360/266.1 |
| 5,521,778 A | * | 5/1996 | Boutaghou et al. ...... | 360/264.5 |
| 5,666,243 A | * | 9/1997 | Brent ...................... | 360/265.9 |
| 5,731,932 A | * | 3/1998 | Crane ...................... | 360/244.5 |
| 5,731,934 A | * | 3/1998 | Brooks et al. ........... | 360/266.1 |
| 5,838,518 A | * | 11/1998 | Frater ...................... | 360/244.5 |
| 5,936,805 A | * | 8/1999 | Imaino .................... | 360/294.5 |
| 6,134,087 A | * | 10/2000 | Khan et al. .............. | 360/294.6 |
| 6,226,157 B1 | * | 5/2001 | Kim ........................ | 360/266.1 |
| 6,331,923 B1 | * | 12/2001 | Mei ........................ | 360/294.4 |
| 6,335,848 B1 | * | 1/2002 | Mei ........................ | 360/294.4 |
| 6,469,869 B1 | * | 10/2002 | Vera ........................ | 360/244.5 |
| 6,487,055 B1 | * | 11/2002 | Mei ........................ | 360/294.4 |
| 6,597,541 B2 | * | 7/2003 | Nishida et al. .......... | 360/294.4 |
| 6,614,627 B1 | * | 9/2003 | Shimizu et al. .......... | 360/294.4 |
| 6,624,982 B2 | * | 9/2003 | Masuda et al. .......... | 360/294.4 |
| 6,661,619 B2 | * | 12/2003 | Nishida et al. .......... | 360/294.4 |
| 2002/0089793 A1 | * | 7/2002 | Nakagawa et al. ...... | 360/294.4 |
| 2002/0097528 A1 | * | 7/2002 | Williams et al. ......... | 360/294.3 |

* cited by examiner

*Primary Examiner*—Brian E. Miller
(74) *Attorney, Agent, or Firm*—Faegre & Benson LLP

(57) ABSTRACT

A microactuated head suspension including a mounting region for attachment of the head suspension to a source of primary actuation, a pair of generally arcuate ring springs and a connecting member. The ring springs at spaced locations extending from the mounting region with at least one aperture interposed between the pair of ring springs. Each ring spring having concave sides that are substantially free from linear sections and are oriented away from a longitudinal centerline of the head suspension. The connection member is located opposite the mounting region and is spaced from the mounting region by the at least one aperture. The connection member joins ends of the pair of ring springs. In addition, the head suspension may include at least one microactuator for secondary actuation of the head suspension. The microactuator is operationally mounted relative to the pair of ring springs.

27 Claims, 17 Drawing Sheets

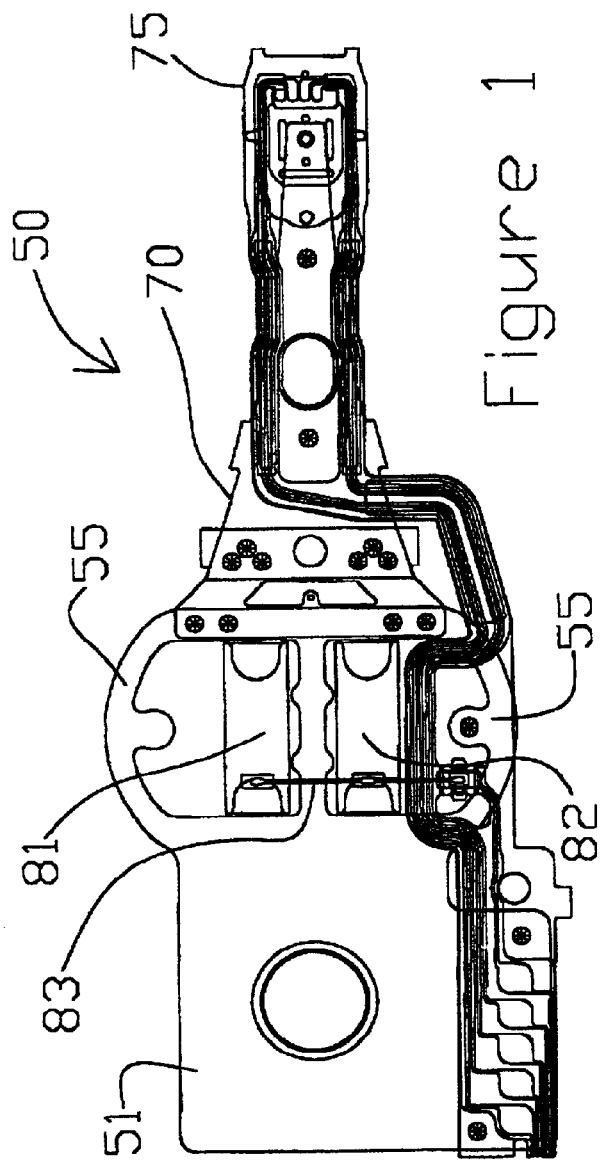
Figure 1
Figure 2

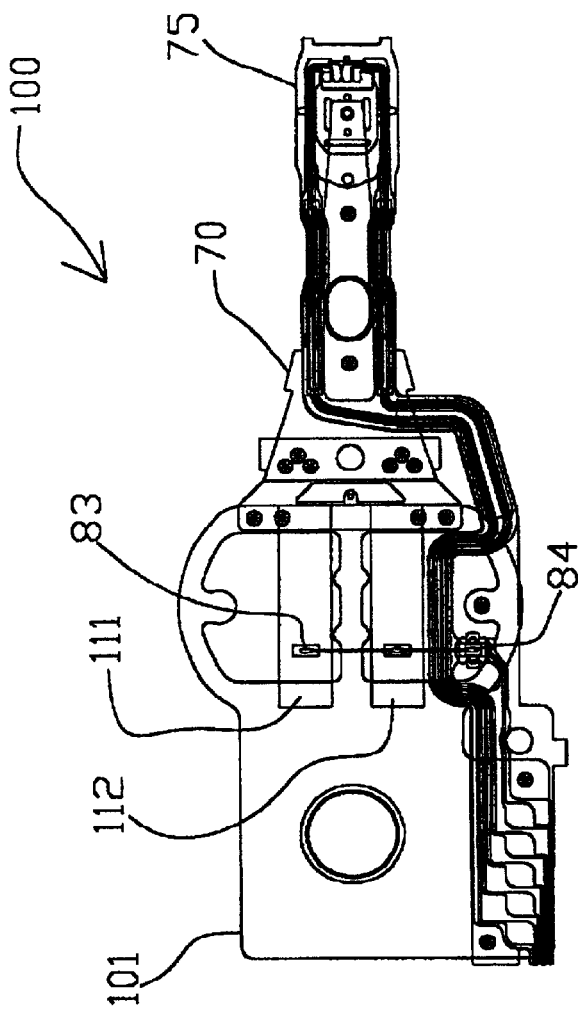
Figure 8
Figure 9

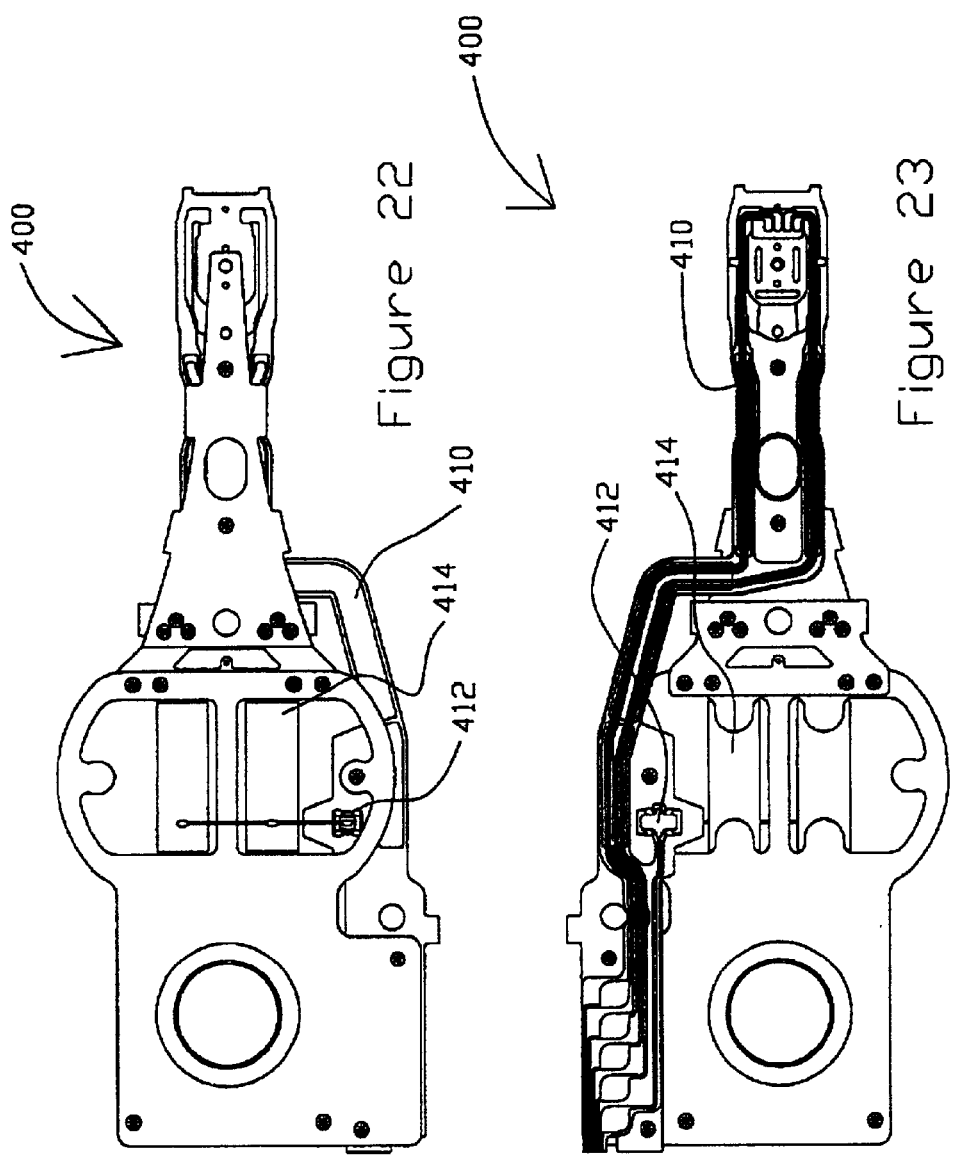

MICROACTUATED HEAD SUSPENSION WITH RING SPRINGS

The present application claims priority to U.S. provisional application, Ser. No. 60/251,412, entitled MULTI-PIECE MICROACTUATOR FOR DISK DRIVE HEAD SUSPENSION, filed on Dec. 5, 2000, which is herein incorporated by reference in its entirety.

FIELD OF THE INVENTION

This invention relates to head suspension assemblies including ring springs in conjunction with microactuators for secondary actuation.

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk which is referred to as the "fly height."

Head suspensions for rigid disk drives typically include a base plate, load beam and a flexure. The load beam typically includes a mounting region at its proximal end for mounting the head suspension to an actuator of the disk drive, typically at a base plate of the head suspension. The load beam also includes a rigid region and a spring region between the mounting region and the rigid region for providing a spring force to counteract the aerodynamic lift force generated on the head slider during the drive operation as described above. The flexure typically includes a gimbal region having a slider mounting surface where the head slider is mounted. The gimbal region is resiliently moveable with respect to the remainder of the flexure in response to the aerodynamic forces generated by the air bearing. The gimbal region permits the head slider to move in pitch and roll directions to follow disk surface fluctuations.

In one type of head suspension the flexure is formed as a separate piece having a load beam mounting region which is rigidly mounted to the distal end of the load beam using conventional methods such as spot welds. Head suspensions of this type typically include a load point dimple formed in either the load beam or the gimbal region of the flexure. The load point dimple transfers portions of the load generated by the spring region of the load beam, or gram load, to the flexure, provides clearance between the flexure and the load beam, and functions as a point about which the head slider can gimbal in pitch and roll directions to follow fluctuations in the disk surface.

Disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the motor and servo control system to quickly and accurately position the read/write head over the desired track. Attempts to improve this situation have included the provision of another or secondary actuator or actuators, such as a piezoelectric, electrostatic or electromagnetic microactuator or fine tracking motor, mounted on the head suspension itself. These types of actuators are also known as second-stage microactuation devices and may be located at the base plate, the load beam or on the flexure.

SUMMARY OF THE INVENTION

The present invention provides a microactuated head suspension including a mounting region for attachment of the head suspension to a source of primary actuation, a pair of generally arcuate ring springs and a connecting member. The ring springs are at spaced locations extending from the mounting region with at least one aperture interposed between the pair of ring springs. Each ring spring has concave sides that are substantially free from linear sections and are oriented away from a longitudinal centerline of the head suspension. The connection member is located opposite the mounting region and is spaced from the mounting region by the at least one aperture. The connection member joins ends of the pair of ring springs.

In addition, the head suspension may include at least one microactuator for secondary actuation of the head suspension. The microactuator is operationally mounted relative to the pair of ring springs. In one embodiment, the microactuator is mounted on a top surface of the mounting region and connecting member. Alternatively, the microactuator is mounted on tabs formed integrally with the mounting region and connecting member or provided by a separate component. In one embodiment, the head suspension includes a base plate in which the ring springs are formed. The base plate includes the mounting region and connecting member.

In another aspect of the present invention, a microactuated head suspension is provided including a pair of generally arcuate ring springs each having a positive radius greater than about 1 millimeter with a center point on the head suspension. In one embodiment, the ring springs have an arc angle of less than about 100 degrees.

BRIEF DESCRIPTION OF THE SEVERAL VIEWS OF THE DRAWINGS

FIG. 1 is a top view of a first embodiment of a multi-piece head suspension including a microactuator mounted in-base.

FIG. 2 is a side view of the head suspension of FIG. 1.

FIG. 8 is a top view of a second embodiment of a multi-piece head suspension including a microactuator mounted on-base.

FIG. 9 is a side view of the head suspension of FIG. 8.

FIG. 22 is a top view of a sixth embodiment of a multi-piece head suspension including a microactuator mounted in-base.

FIG. 23 is a bottom view of the head suspension shown in FIG. 22.

DETAILED DESCRIPTION OF THE INVENTION

Figure 3:
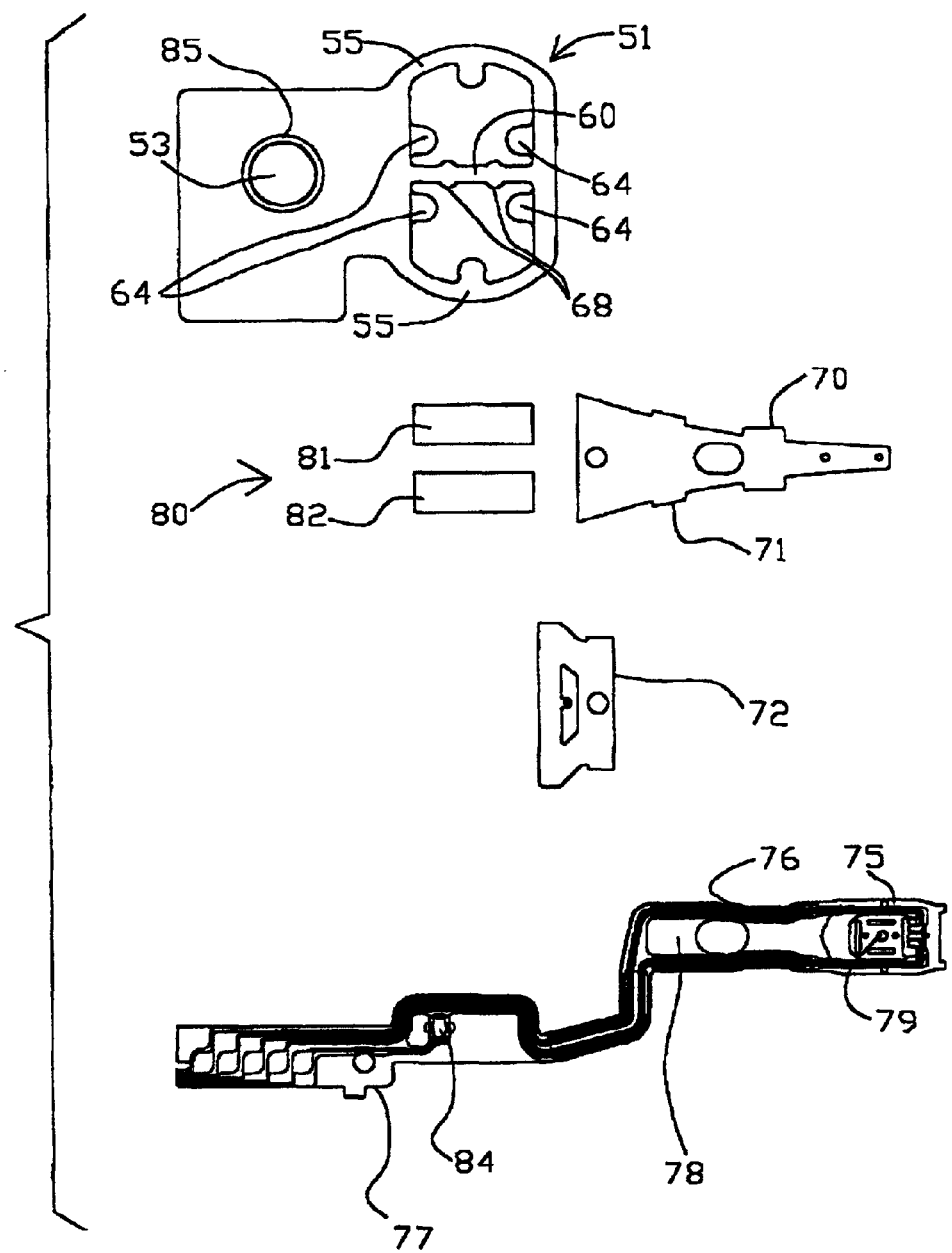
FIG. 3 is a top view of the components of the head suspension of FIG. 1.

With reference to the attached Figures, it is to be understood that like components are labeled with like numerals throughout the several Figures. Referring now to FIGS. 1 to 7, a first embodiment of a head suspension 50 in accordance with the present invention is shown, including a base plate 51, a load beam 70, a flexure 75 and a microactuator 80. The load beam 70 includes a rigid region 71 and a separate spring or radius region 72 that are fastened together, such as by welding or other suitable method as is known in the art. Numerous types of load beams 70, including both single piece and multiple piece configurations, are known in the art and are suitable for use on head suspensions 50 formed in accordance with the present invention. Alternatively, the base plate 51 and load beam 70 may be formed as a unitary member, or the base plate 51 may be formed unitarily with the actuation mounting system. This latter configuration is referred to by the assignee, Hutchinson Technology Inc. (hereinafter "HTI"), and known in the art as a unamount arm. The base plate 51 is preferably formed from stainless steel die stamping or a coining process, however, other materials such as plastics, composites, aluminum, clads and ceramics and other fabrication methods such as partial etching, casting and molding may be used as are known in the art.

Flexure 75 includes a head slider mounting region 79 configured to gimbal a head slider (not shown) as described above in the Background section. The flexure 75 is preferably a TSA-type flexure having integrally formed leads 76 routed along an elongated support 78 at the head slider mounting region 79 and a tail 77 to the base plate 51. The flexure 75 is well known in the industry and available commercially from HTI and other suppliers. Various flexure configurations and benefits related thereto are discussed in more detail after the description of the various embodiments.

The base plate 51 includes a mounting region 52 and a ring spring region 54. The mounting region 52 includes an opening 53 and preferably a swage boss 85 or other mounting mechanism that mounts the base plate 51 to a head suspension actuation system, such as a servo actuator or other known system (not shown, but described above in the Background section). The ring spring region 54 includes a pair of motor ring springs 55, symmetrically positioned about a center line 56 with at least one aperture 57 interposed between them. The concave side of the ring springs 55 face the center line 56. The ring springs 55 are connected on one side by the mounting region 52 and on the opposite side by connecting member 65. In this embodiment, each ring spring 55 also includes at least one attachment tab 67, one of which is used for mounting to the flexure 75 at the tail 77, such as by welding or other suitable methods.

Figure 4:
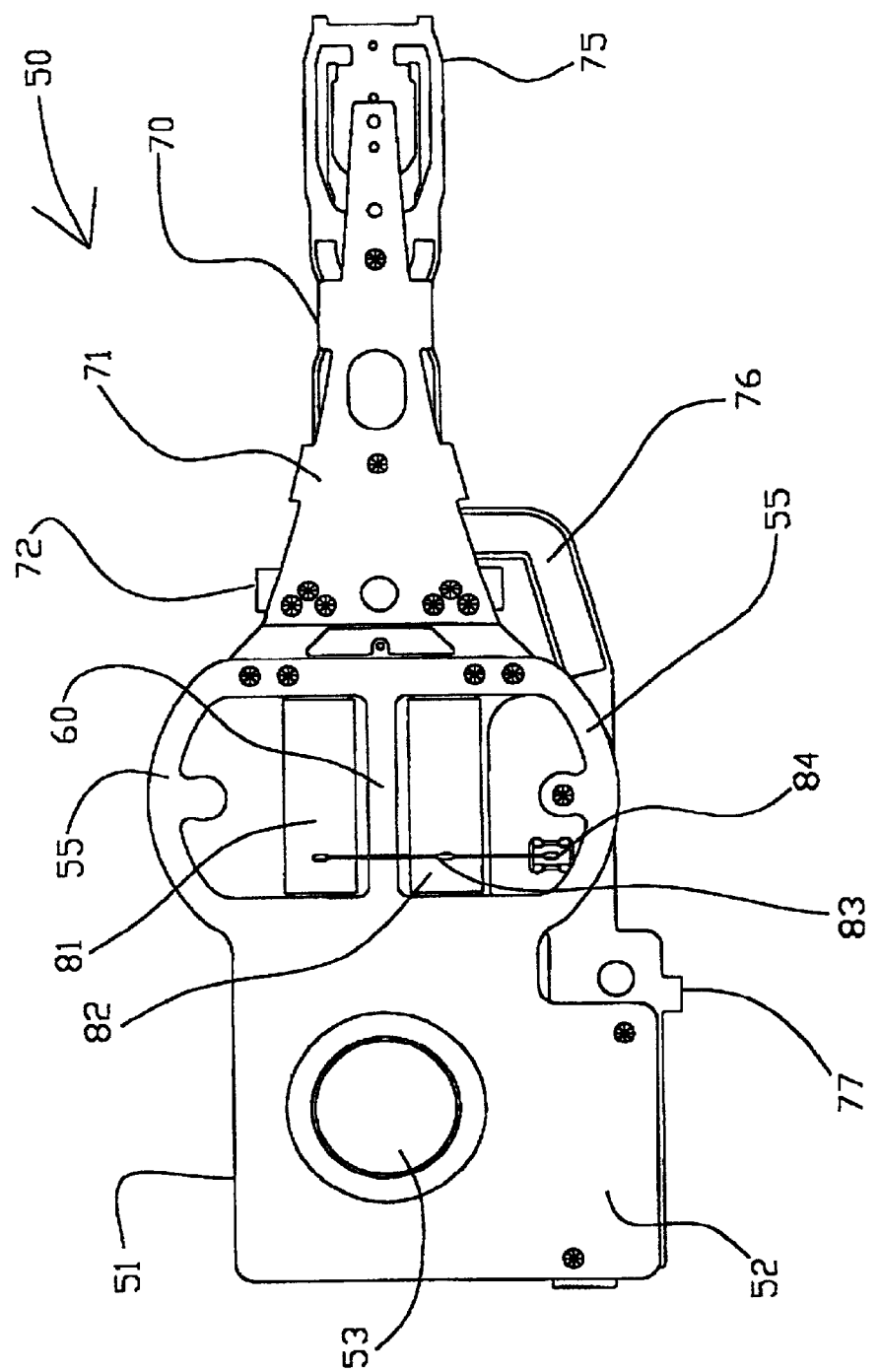
FIG. 4 is a top detailed view of the head suspension of FIG. 1.
Figure 5:
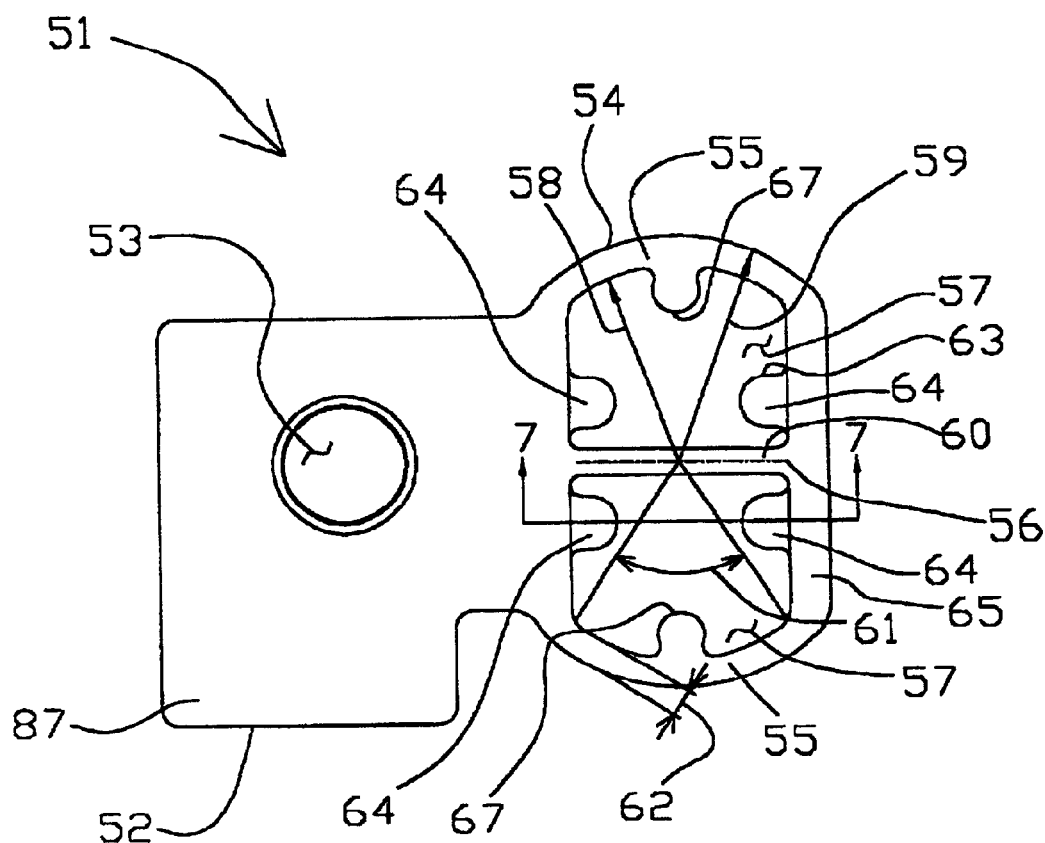
FIG. 5 is a top view of the base plate of the head suspension of FIG. 1.
Figure 6:
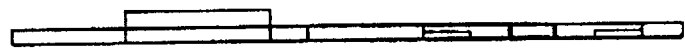
FIG. 6 is a side view of the base plate of FIG. 5.
Figure 16:
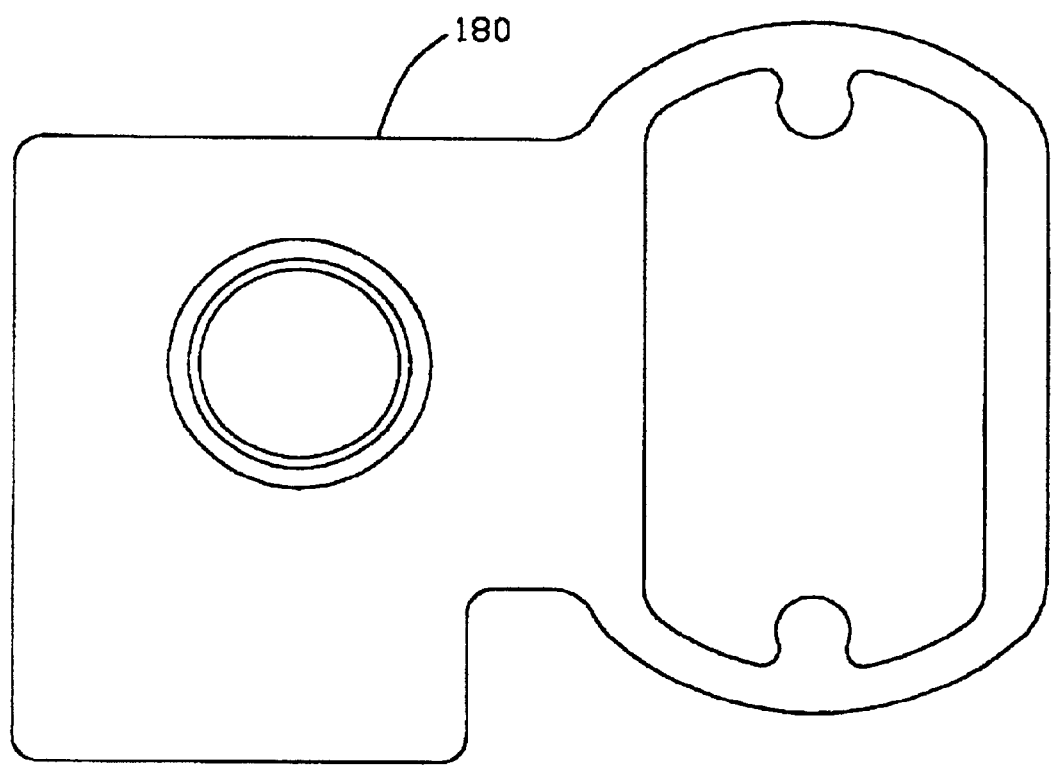
FIG. 16 is a top view of an alternate base plate usable with the head suspension embodiments.

In this embodiment, a center spar 60 is positioned along the center line 56. The center spar 60 spans from the mounting region 52 to the connecting member 65 and divides the area between the two ring springs 55 into two apertures 57. As shown in FIGS. 1 and 2, center spar 60 may include one or more protrusions 68 that extend transversely from the center line 56 into the apertures 57. These protrusions 68 may be provided to aid in assembling the head suspension 50 by creating a stop up against which the microactuator 80 may be placed to correctly position the microactuator 80 with respect to the center spar 60 and apertures 57. As shown in FIGS. 4 and 5, however, inclusion of these protrusions 68 on the center spar 60 is optional. In addition, provision of a center spar itself is optional, as shown by base plate 180 in FIG. 16, although inclusion of a center spar is preferred to reduce the amount gram load carried by the microactuation motors.

Figure 7:
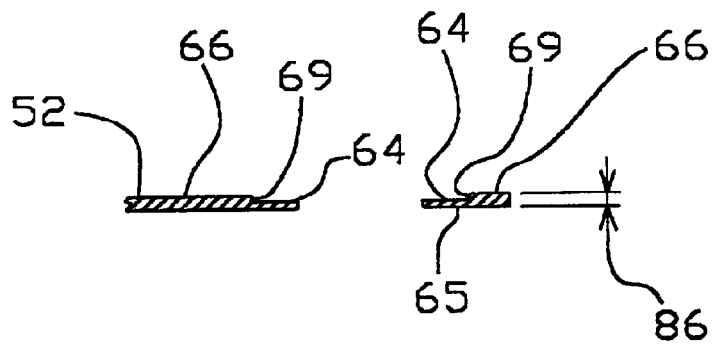
FIG. 7 is a cross-sectional view of the base plate flanges taken along Line 7—7 in FIG. 5.
Figure 10:
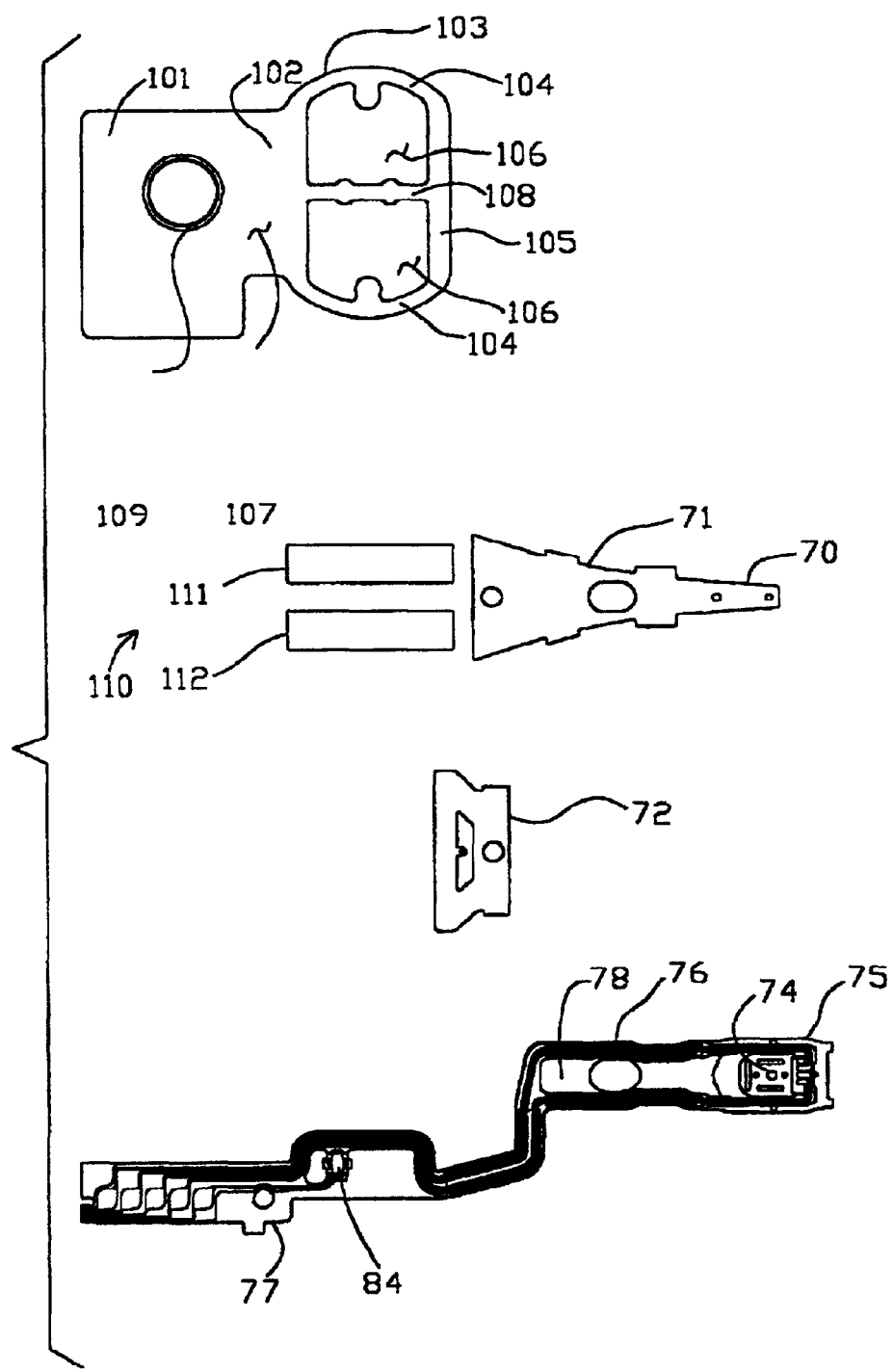
FIG. 10 is a top view of the components of the head suspension of FIG. 8.
Figure 11:
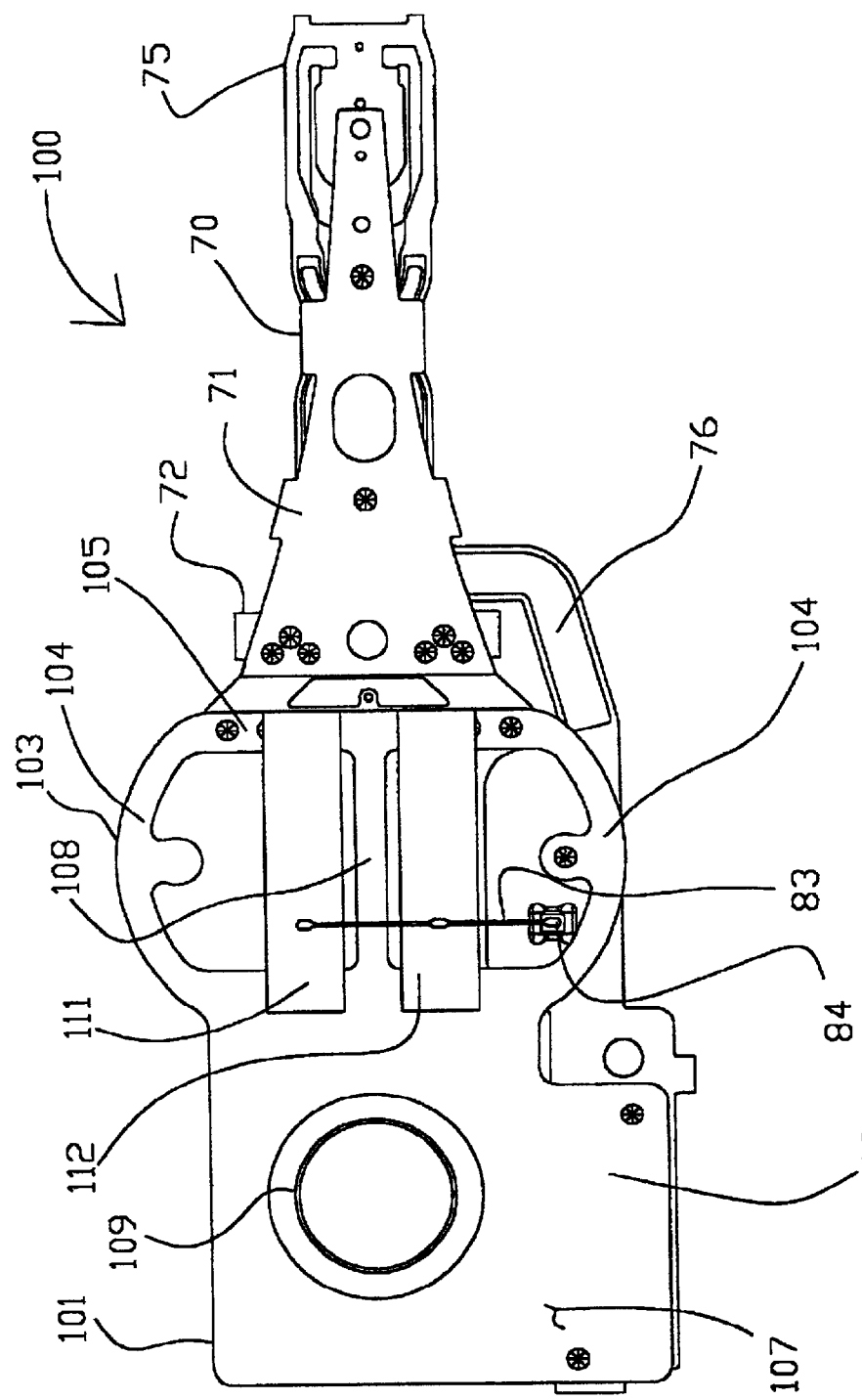
FIG. 11 is a top detailed view of the head suspension of FIG. 8.
Figure 12:
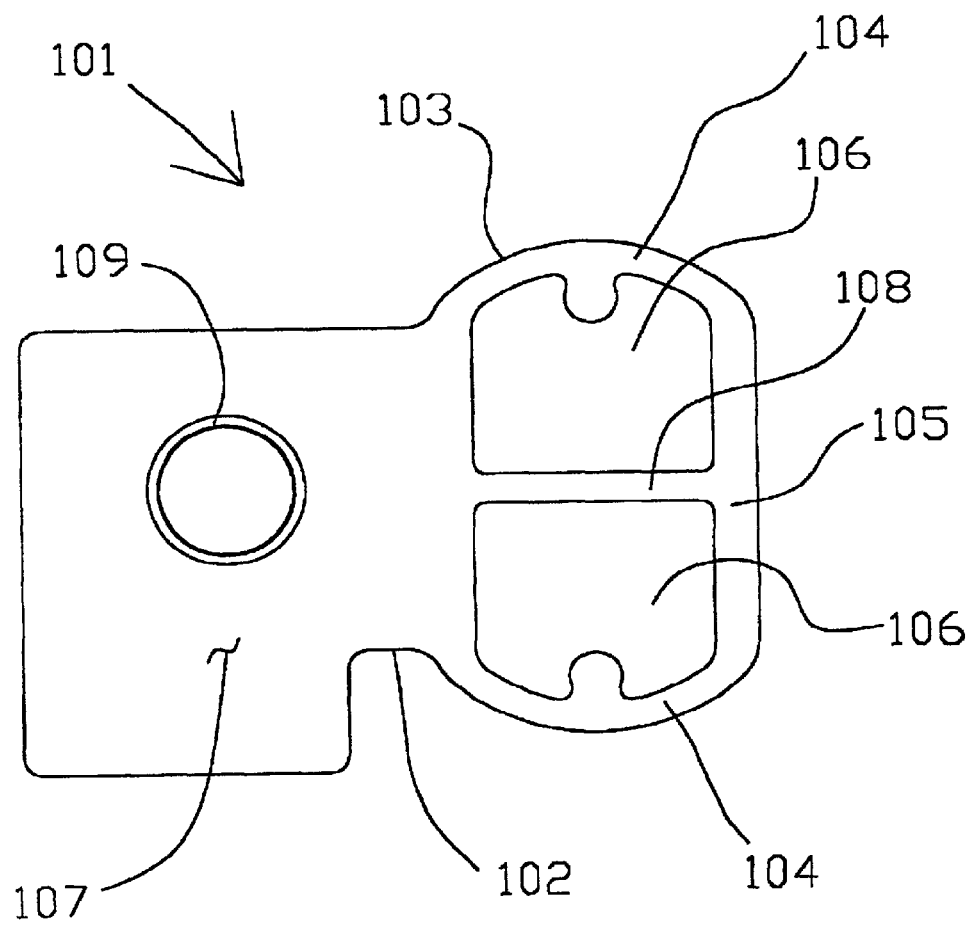
FIG. 12 is a top view of the base plate of the head suspension of FIG. 8.
Figure 13:
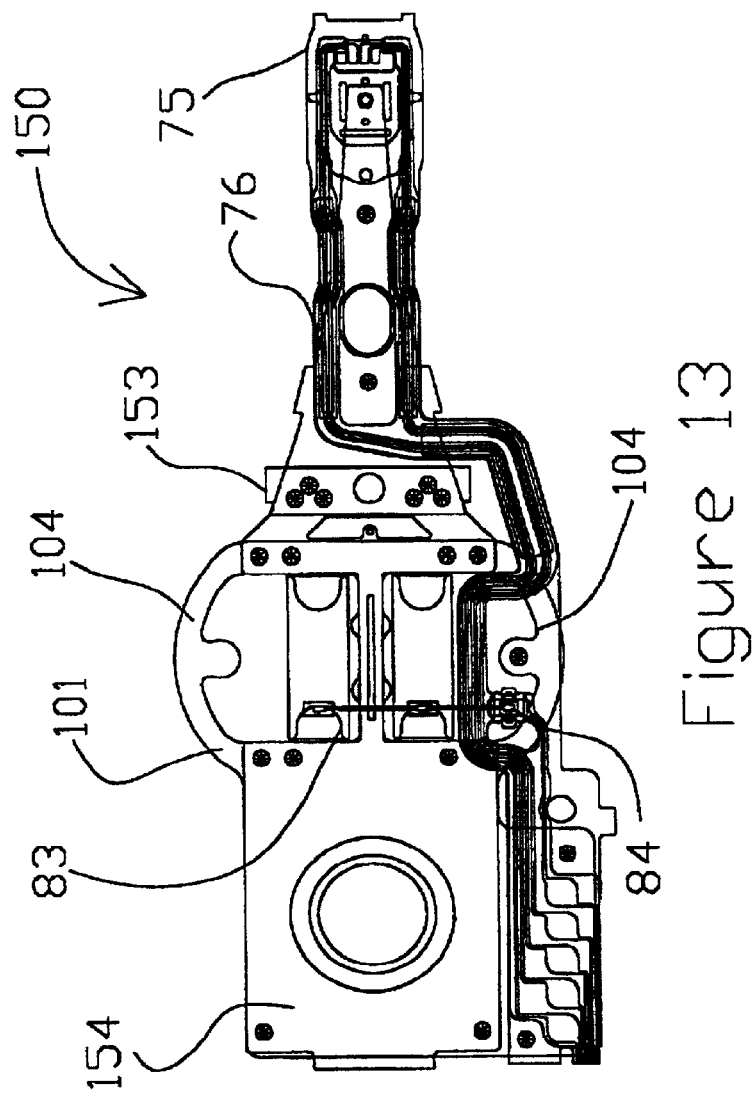
FIG. 13 is a top view of a third embodiment of a multi-piece head suspension including a microactuator mounted in-base.
Figure 14:
FIG. 14 is a side view of the head suspension of FIG. 13.
Figure 15:
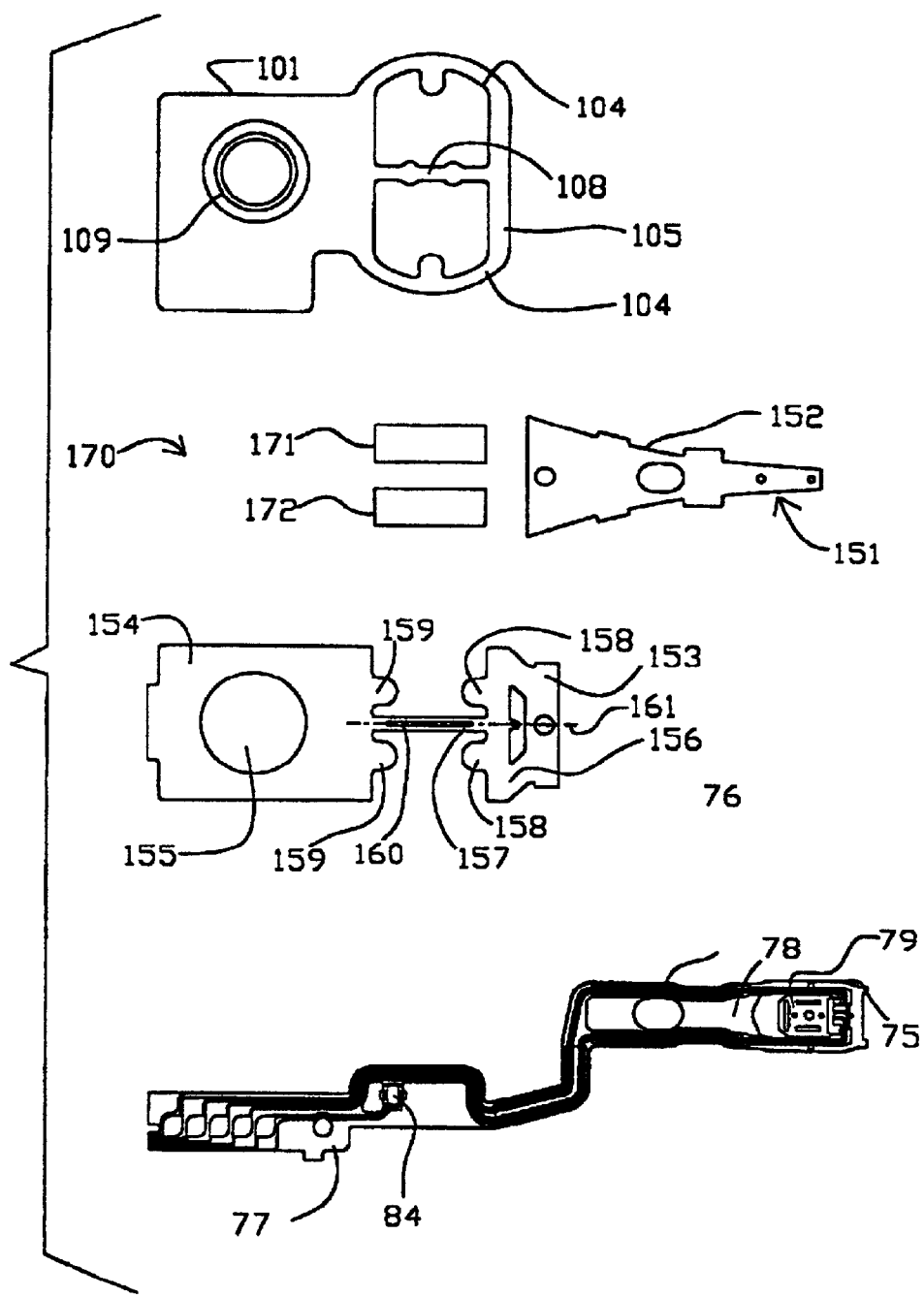
FIG. 15 is a top view of the components of the head suspension of FIG. 13.

Each ring spring 55 is configured as an arcuate section having a positive inner radius 58 and a positive outer radius 59. That is, the center points of each radius 58, 59 are located on the base plate 51 and are preferably the same point, but may be different points, if desired. Preferably, these arcuate sections are circular sections. It is to be understood, however, that the ring springs 55 are not limited to only arcuate sections, as other shapes are also contemplated and within the scope of the present invention. In this embodiment, the inner radius 58 ranges from about 1.0 millimeters to about 3.0 millimeters; preferably from about 2.0 millimeters to about 2.5 millimeters. In one preferred embodiment, the inner radius 58 is about 2.27 millimeters. The outer radius 59 ranges from about 1.4 millimeters to about 4.0 millimeters; preferably from about 2.5 to about 3.0 millimeters. In one preferred embodiment, the outer radius 59 is about 2.67 millimeters. As shown in FIG. 7, the thickness 86 of the ring springs 55 may range from about 0.15 millimeters to about 0.35 millimeters. In one preferred embodiment, the thickness 86 is about 0.20 millimeters.

Continuous curvature motor springs 55 serve to spread stress, deflection strain, and displacement relatively evenly across the entire spring structure 54. The arcuate ring shaping of the ring springs 55 also serves to reduce the overall width of the base plate spring region 54 required to provide a satisfactory trade-off between stroke, that is the movement of the head slider in response to actuation of the microactuators 80, and sway resonant mode performance of the head suspension 50.

Each ring spring 55 has a sector angle, such as angle 61, that ranges from about 30 degrees to about 170 degrees, determined at the center point of the outer and inner radii 58, 59. Preferably, the sector angle 61 of each ring spring 55 ranges from about 50 degrees to about 100 degrees, and more preferably from about 75 degrees to about 90 degrees. Each ring spring 55 also has a width 62 that ranges from about 0.2 to about 0.6 millimeters; preferably from about 0.38 to about 0.42 millimeters. In one preferred embodiment, the width 62 is about 0.4 millimeters.

The ring spring region 54 also includes a microactuator attachment region 63 wherein the microactuator 80 is mounted to the base plate 51. In this embodiment, the microactuator attachment region 63 includes two pairs of mounting tabs 64 that are symmetrically positioned on either side of the center spar 60 within the apertures 57. Two of the tabs 64 are attached on the side of the mounting region 52 and two of the tabs 64 are attached to the connection member 65. In this embodiment, the mounting tabs 64 are stamped, coined or otherwise recessed from a base plate top surface 66, as best shown in FIG. 7, resulting in a generally perpendicular side wall 69 connecting the two. Other methods of forming recessed, integral tabs include, but are not limited to, machining or etching.

The microactuator 80 includes first and second microactuator motors 81 and 82, respectively, that are sized to mount on the pairs of tabs 64, spanning the apertures 57. As a result, the microactuator motors 81, 82 are inset within the ring spring region 54 between the mounting region 52 and the connecting member 65, positioned and mated preferably using highly accurate automated assembly equipment, such as pick and place machines used in the printed circuit board and chip fabrication industries. The microactuator motors 81, 82 are preferably attached to the base plate 51 at the tabs 64 by adhesive that may be conductive, non-conductive or a combination of both. Other methods for attachment of the microactuator motors 81, 82 may include, but are not limited to, brazing. As described above, protrusions 68 on center spar 60 are a stop that allows for faster and easier positioning and placement of the microactuator motors 81, 82 on the base plate 51. As a result, less precise placement systems, such as manual insertion, may be used while still achieving correct placement of the microactuator motors 81, 82.

The microactuator motors 81, 82 are electrically connected to the head suspension 50 by wire stitching, such as connection 83, from each microactuator motor 81, 82 to the traces 76 of the flexure 75. A electrical connection pad 84 specifically positioned for connection 83 is preferably provided on the flexure 75.

As the microactuator motors 81, 82 are activated through electrical input at connection 83, each microactuator motor 81, 82 is expanded or contracted, individually or simultaneously, to achieve very fine secondary movement of the head slider on the head suspension 50. As the microactuator motors 81, 82 move, the ring springs 55 flex to accommodate the microactuator movement and transmit that movement to the load beam 70 and thus to the head slider mounted on the flexure 75. Such second-stage actuation may compensate for head suspension actuation errors, variations in the disk configuration, and/or may provide fine movement control allowing precise and accurate head slider tracking in the ever smaller disk drive environment.

Referring now to FIGS. 8–12, a second embodiment of a head suspension 100 in accordance with the present invention is shown, including a base plate 101 and a microactuator 110. The load beam 70 and flexure 75 are the same as or similar to those described in the first embodiment, and thus have the same reference numbers. Other features are the same or similar to those described in the first embodiment, and thus are not again described in this embodiment.

In this embodiment, however, the base plate 101 differs in that the microactuator 110 is configured to be mounted on the base plate 101, rather than be inset in the base plate 51 as described in the first embodiment. The base plate 101 includes a mounting region 102 having a swage boss 109 and a ring spring region 103 having a pair of ring springs 104 connected by a connection member 105, similar to that described above. Instead of having two pairs of mounting tabs, such as tabs 64, to which the microactuator 80 is attached, the present embodiment mounts the microactuator 110 directly on the mounting region 102 and the connection member 105. The microactuator 110 is configured as first and second microactuator motors 111 and 112, respectively, that are sized to span apertures 106 on either side of center spar 108 and overlap at least a portion of the mounting region 102 and connection member 105.

The microactuator motors 111, 112 are attached to the top surface 107 of the base plate 101 by adhesive that may be conductive, non-conductive or a combination of both, or other suitable methods. The microactuator motors 111, 112 are then electrically connected to the traces 76 of the flexure 75 by wire stitching in the same manner described above. When activated, the top mounted microactuator motors 111, 112 provide the same second-stage actuation and head slider movement control as the first embodiment.

Top mounting of the microactuator motors 111, 112 may be preferably due to easier manufacturing, including the not requiring application of adhesive at a vertical joint on the ends of the microactuator motors 111, 112. In addition, there is less risk of shorting out the microactuator motors 111, 112 during manufacturing and adhesive attachment. It is also possible that greater stroke may be obtained at lower resonant performance of the head suspension.

Referring now to FIGS. 13–18, a third embodiment of a head suspension 150 in accordance with the present invention is shown including a microactuator 170. In this embodiment, the base plate is the same as or similar to base plate 101 shown in the second embodiment and the flexure is the same as or similar to flexure 75 previously shown. Therefore, these items and their respective components are numbered the same. However, in this embodiment, the load beam 151 is different and includes a rigid region 152 and a separate hinge portion 153, and provides tabs 158, 159 separate from the base plate 101 for mounting of the microactuator 170, as described below.

The hinge portion 153 includes a mounting region 154 having an aperture 155 that has a corresponding position but larger diameter than the base plate swage boss 109. The hinge portion 153 also includes a spring or radius region 156 that is similar in size and shape to previously described spring region 72. However, spring region 156 is connected via a member 157 to the mounting region 154. Member 157 may include a narrow, elongated aperture 160. Member 157 is aligned along a centerline of the base plate, such as centerline 161, and may be configured to underlie or overlie a center spar, such as center spar 108. However, an alternative embodiment of the base plate 101, such as base plate 180 shown in FIG. 16, does not include a center spar, and thus member 157 would not overlie or underlie such a center spar, but would instead provide its own center spar type component.

In this embodiment, member 157 serves to join the mounting region 154 and radius region 156 of the hinge portion 153. Member 157, positioned along the centerline 161 of the assembly, is a way of maintaining continuity during processing and aids in fabrication of the tabs 158, 159. By connecting the radius region 156 and mounting region 154, more precise positioning of tabs 158, 159 relative to each other is possible. Therefore, the length of microactuator motors 171, 172 are more readily accommodated, resulting in improved stroke movements or resonant frequency mode variation. In addition, use of member 157 eliminates the need to form the tabs 158, 159 with connections between the two that are later sheared off or otherwise removed.

Mounting tabs 158 are formed on the radius region 156 as a pair that are positioned symmetrically on either side of member 157. Mounting tabs 159 are formed as a corresponding pair on mounting region 154 and are positioned to align with the tabs 158 across apertures 106 when the hinge portion 153 is attached to the base plate 101, preferably on the underside. As a result, the hinge portion 153 and base plate 101 combination provide mounting surfaces for the microactuator 170, which are similar to tabs 64 shown in the first embodiment. With the hinge portion 153 mounted to the underside of base plate 101, the tabs 158, 159 lie below the base plate 101 and first and second microactuator motors, 171 and 172, respectively, attached to the tabs 158, 159 are then inset in the base plate 101, spanning the apertures 106. Mounting of the microactuator motors 171, 172 to the tabs 158, 159 and electrical connection to traces 76 may be accomplished in manner similar to those described above.

Use of mounting tabs 158, 159 that are provided separate from the base plate 101 is beneficial in that the formation of base plate 101 is simplified as compared to base plate 51, wherein tabs 64 are integrally formed therein. In addition, in this embodiment, the microactuator motors 171, 172 are even more recessed than in the first embodiment with a top surface of the microactuator motors 171, 172 being flush with or below a top surface of the base plate 101. As a result, there is more clearance between one suspension and another mounted oppositely upon an E-block arm.

Figure 17:
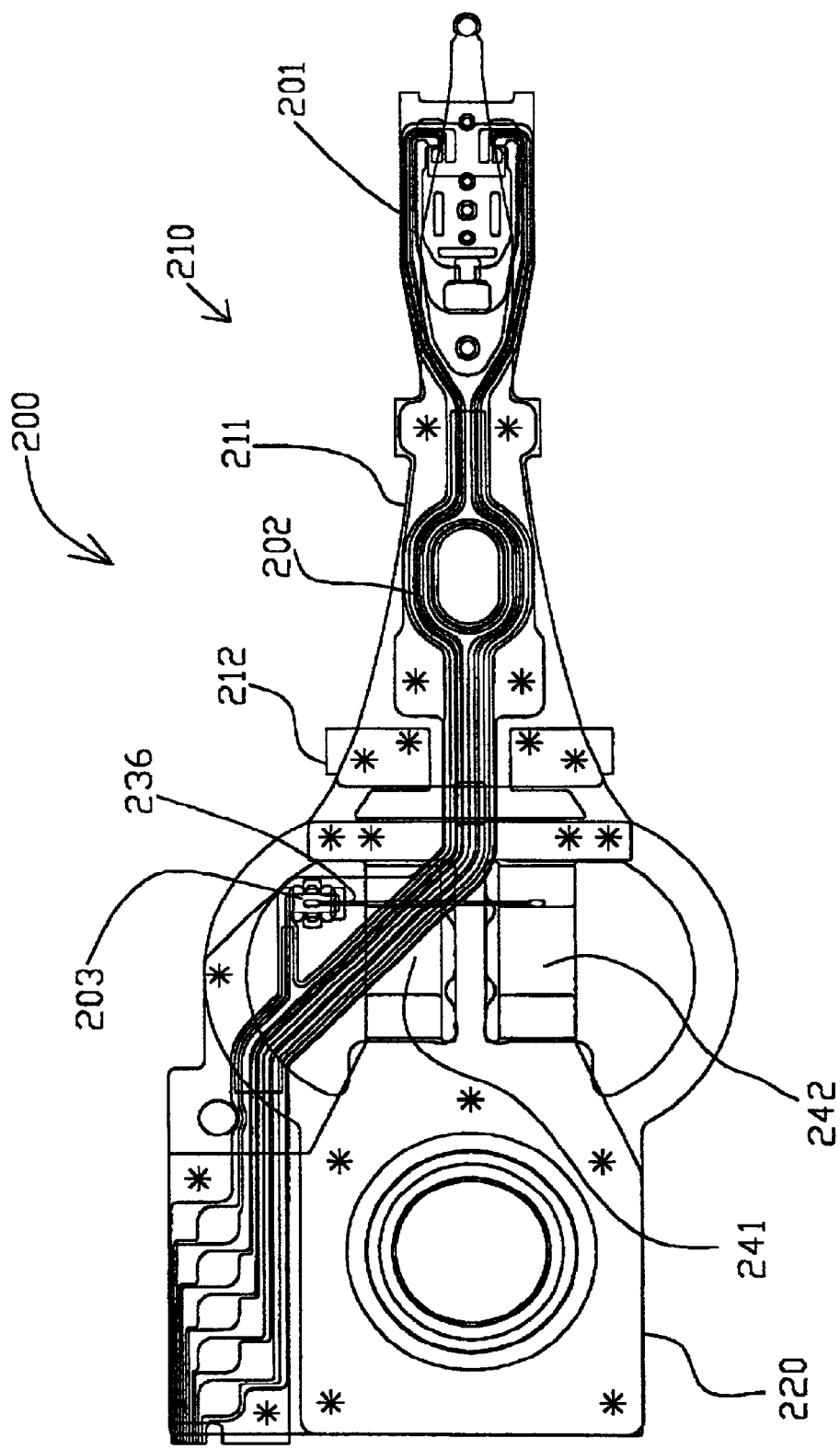
FIG. 17 is a top view of a fourth embodiment of a multi-piece head suspension including a microactuator mounted in-base.
Figure 18:
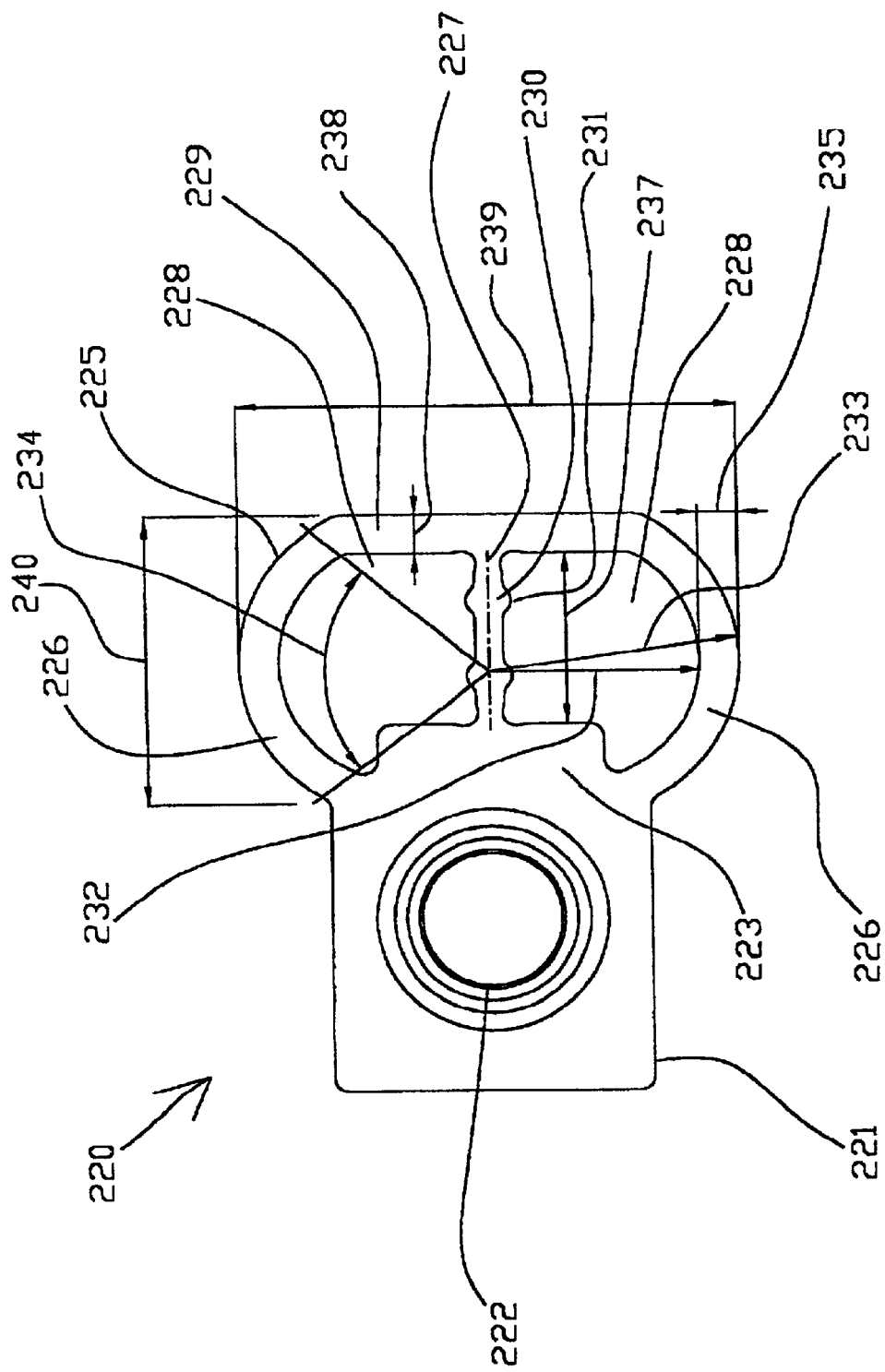
FIG. 18 is a top detailed view of the base plate of the head suspension of FIG. 17.
Figure 19:
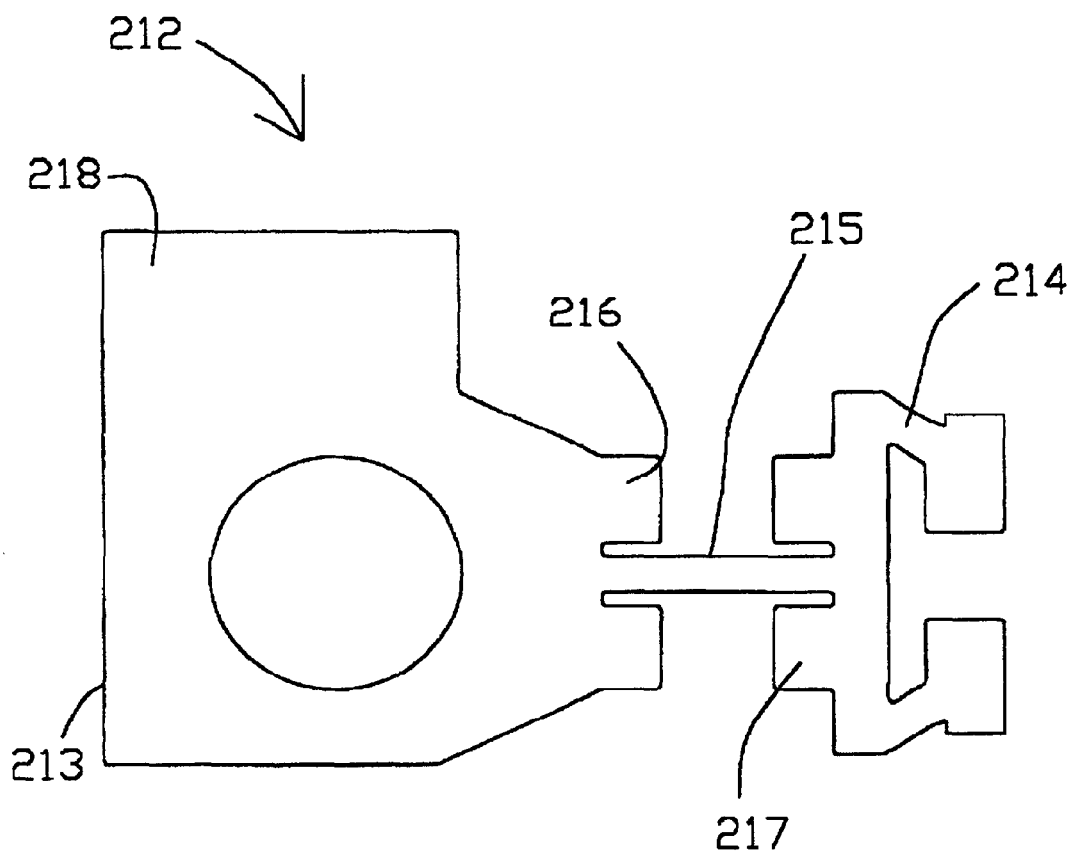
FIG. 19 is a top detailed view of the hinge portion of the multi-piece load beam of the head suspension of FIG. 17.

Referring now to FIGS. 17–19, a fourth embodiment of a head suspension 200 in accordance with the present invention is shown including a microactuator motors 241 and 242. In this embodiment, the head suspension 200 includes a flexure 201 and a load beam 210 having a rigid region 211 and a hinge portion 212, shown best in FIG. 19. The hinge portion 212 is similar in configuration to the hinge portion 153 of the third embodiment. Alternatively, other configurations of load beams, including multi-piece load beams, hinge portions or various configurations of spring portions, such as those shown in the first and second embodiments, may be used with head suspension 200. Hinge portion 212 includes a mounting region 213 and a spring region 214 joined by a center member 215, similar to member 157 as described above. The mounting and spring regions 213, 214 each include a pair of tabs 216, 217, respectively, for receiving the microactuator motors 241, 242, as described below.

The head suspension 200 also includes a base plate 220 that is similar in configuration to the base plates of the prior embodiments and includes a mounting region 221 and a ring spring region 225. The mounting region 221 includes a swage boss 222 for head suspension mounting and mounting area 223. The ring spring region 225 includes a pair of motor ring springs 226, symmetrically positioned about a center line 227 with at least one aperture 228 interposed between them. The ring springs 226 are connected on one side by the mounting region 221 and on the opposite side by connecting member 229. In this embodiment, an optional center spar 230 is positioned along the centerline 227 spanning between the mounting region 221 and the connecting member 229. Center spar 230 divides the aperture 228 into two apertures 228. Center spar 230 includes two pairs of protrusions 231 extending into apertures 228. Protrusions 231 function in the same manner as protrusions 68, described above.

Each ring spring 226 is configured as an arcuate sector, preferably a circular sector, having a positive inner radius 232 and a positive outer radius 233. In this embodiment, the inner radius 232 ranges from about 1.0 millimeters to about 3.0 millimeters; preferably from about 1.5 millimeters to about 2.5 millimeters. In one preferred embodiment, the inner radius 232 is about 1.81 millimeters. The outer radius 233 ranges from about 1.4 millimeters to about 4.0 millimeters; preferably from about 2.0 to about 3.0 millimeters. In one preferred embodiment, the outer radius 233 is about 2.36 millimeters.

Each ring spring 226 has a sector angle, such as angle 234, that ranges from about 30 degrees to about 170 degrees. Preferably, the sector angle 234 of each ring spring 226 ranges from about 50 degrees to about 100 degrees, and more preferably from about 65 degrees to about 80 degrees. As shown, the sector angle 234 is about 78 degrees. Each ring spring 226 also has a width 235 that ranges from about 0.2 to about 0.8 millimeters; preferably from about 0.4 to about 0.7 millimeters. In one preferred embodiment, the width 235 is about 0.55 millimeters. The connecting member 229 may have a width 238 that is the same as the width 235 of the ring springs 226 or, alternatively, the connecting member width 238 may differ from width 235. In one preferred embodiment, width 238 is the same as width 235 and is about 0.55 millimeters. The thickness of the ring springs 226 preferably ranges from about 0.15 millimeters to about 0.35 millimeters. In a preferred embodiment, the thickness is about 0.20 millimeters. In this embodiment, a width 239 of the pair of ring springs 226 ranges from about 6.5 to about 7.5 millimeters. In one preferred embodiment, the width 239 is about 7.0 millimeters. In this embodiment, length 240 of the ring springs 226 ranges from about 3.7 to about 4.5 millimeters, with a preferred embodiment having a length 240 of about 4.35 millimeters.

In a manner similar to that described in the third embodiment, the hinge portion 212 is mounted to the base plate 220, preferably on the back or bottom side. As a result, the tab pairs 216 and 217 provide mounting surfaces within apertures 228 for the microactuator motors 241, 242. The microactuator motors 241 and 242 are sized to mount on the pairs of tabs 216, 217, spanning the apertures 228. As a result, the microactuator motors 241, 242 are generally inset within the ring spring region 225 between the mounting region 221 and the connecting member 229. The microactuator motors 241, 242 are preferably attached to the base plate 220 at the tabs 216,217, using methods described herein. As described above, protrusions 231 on center spar 230 are a stop that allows for faster and easier positioning and placement of the microactuator motors 241, 242 on the base plate 220.

The microactuator motors 241, 242 are electrically connected to the head suspension 200 by wire stitching, such as connection 236, from each microactuator motor 241, 242 to the traces 202 of the flexure 201. A electrical connection pad 203 specifically positioned for connection 236 is preferably provided on the flexure 201.

In this embodiment, the mounting area 223 of the mounting region 221 protrudes into the apertures 228 between the ring springs 226 with the distance 237 from the mounting area 223 to the connecting member 229 ranging from about 2.3 to about 2.7 millimeters. In one preferred embodiment, the distance 237 is about 2.53 millimeters. When the hinge portion 212 is attached to the base plate 220, the tabs 216 extend from the mounting area 223 into apertures 228. As a result, the ring springs 226 extend beyond the microactuator motors 241, 242 on the mounting region side. This configuration of the ring springs 226 causes lower compliance along a tracking axis of the head suspension 200 for higher lateral stiffness resulting in improved resonant frequency performance at the expense of a lower stroke performance.

Figure 20:
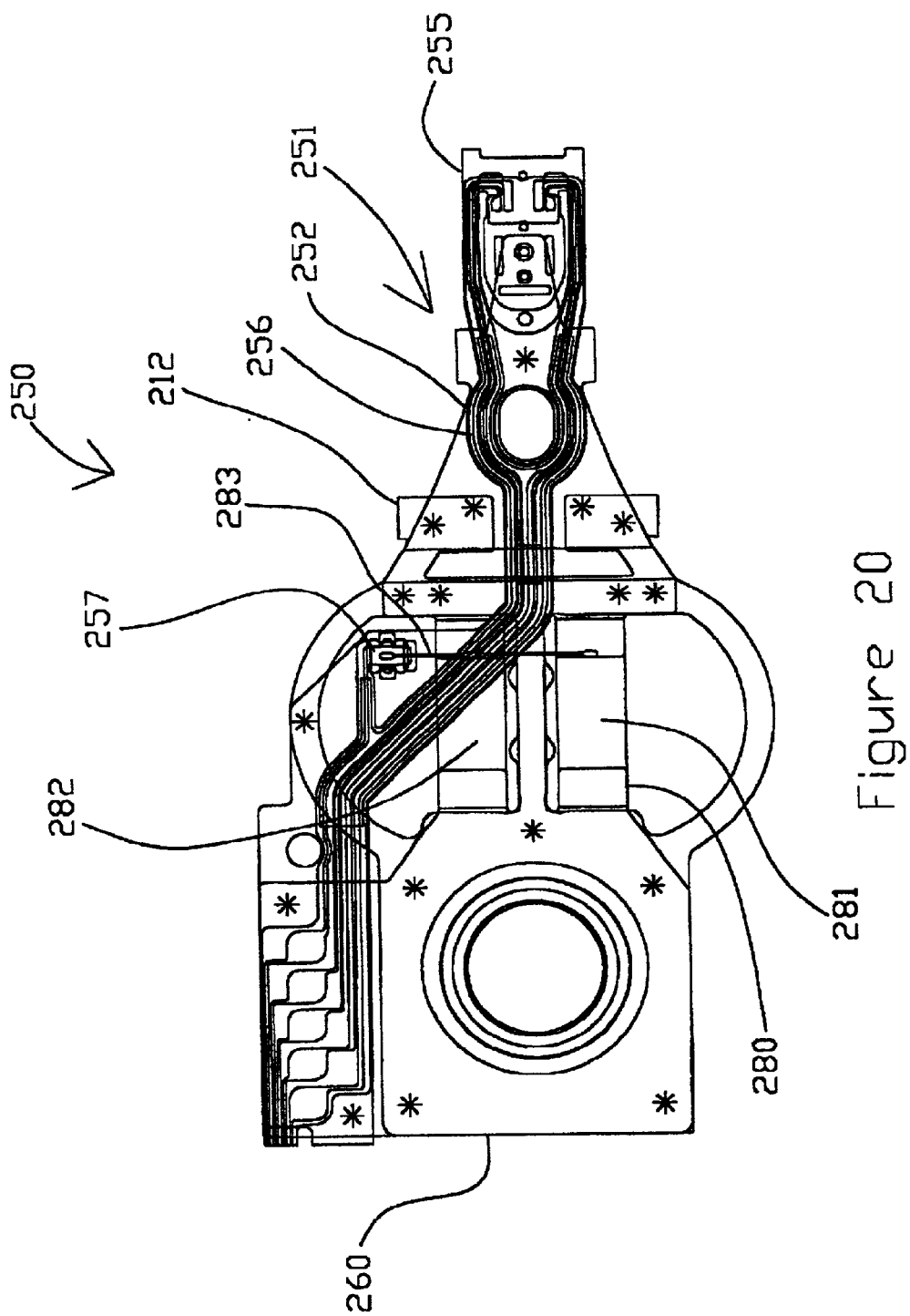
FIG. 20 is a top view of a fifth embodiment of a multi-piece head suspension including a microactuator mounted in-base.
Figure 21:
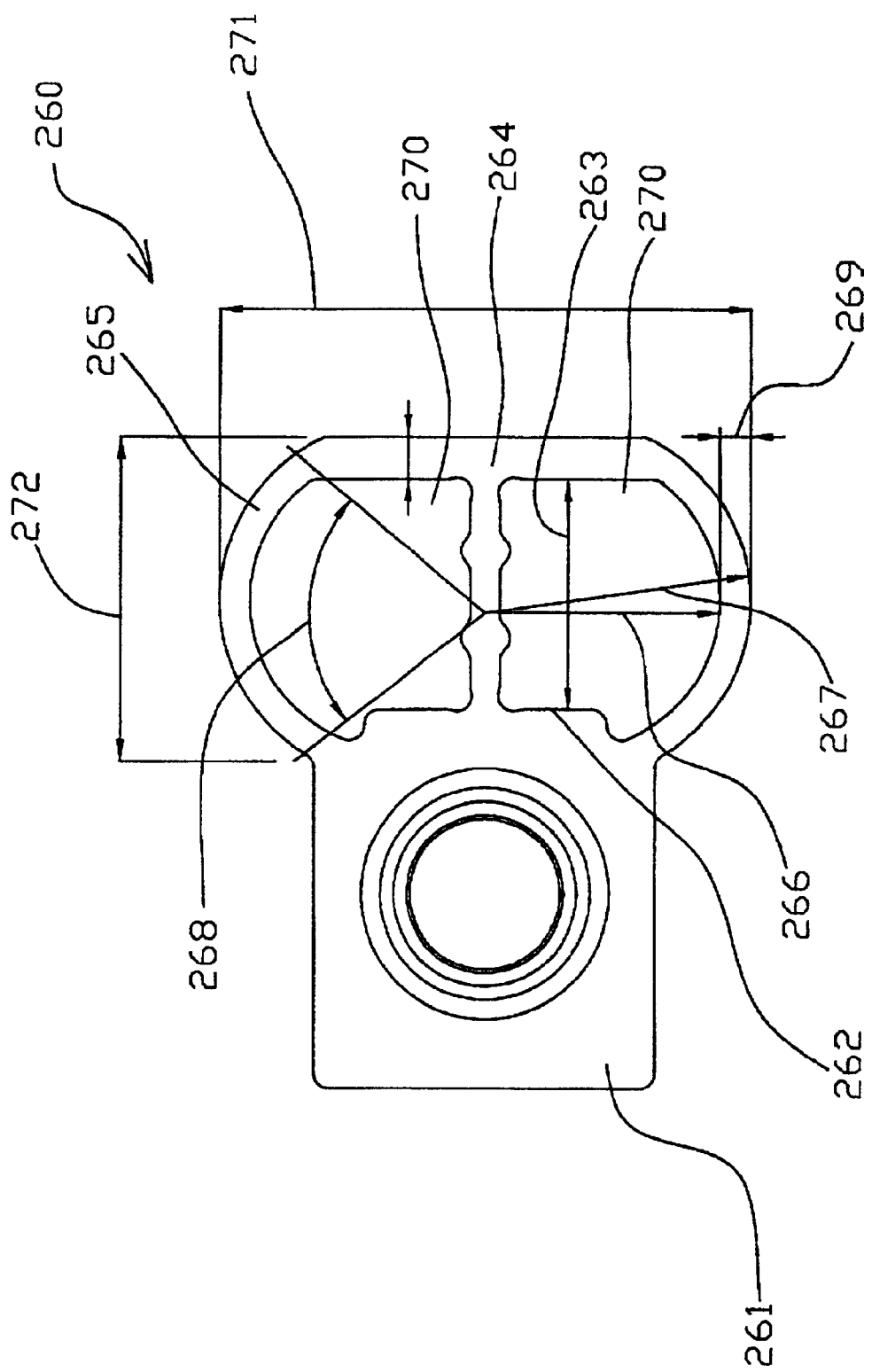
FIG. 21 is a top detailed view of the base plate of the head suspension of FIG. 20.

Referring now to FIGS. 19–21, a fifth embodiment of a head suspension 250 in accordance with the present invention is shown including a microactuator 280. In this embodiment, the head suspension 250 includes a load beam 251 and a flexure 255. The load beam 251 includes a rigid region 252 and a hinge portion that is the same as or similar to hinge portion 212, described above and shown in FIG. 19. Alternatively, other configurations of load beams, including multi-piece load beams, hinge portions or various configurations of spring portions, including those shown in the first and second embodiments, may be used with head suspension 250.

In this embodiment, the head suspension 250 includes a base plate 260 that is similar in configuration to base plate 220 of the prior embodiment. However, in this embodiment, the base plate 260 includes ring springs 265 that have slightly larger inner and outer radii, 266 and 267 respectively, a slightly smaller sector angle 268 and a slightly narrower width 269, than those shown and described in the fourth embodiment. In this embodiment, the inner radius 266 ranges from about 0.3 millimeters to about 3.0 millimeters; preferably from about 1.5 millimeters to about 2.5 millimeters. In one preferred embodiment, the inner radius 266 is about 1.96 millimeters. The outer radius 267 ranges from about 0.7 millimeters to about 4.0 millimeters; preferably from about 2.0 to about 3.0 millimeters. In one preferred embodiment, the outer radius 267 is about 2.36 millimeters.

The sector angle 268 ranges from about 30 degrees to about 170 degrees. Preferably, the sector angle 268 of each ring spring 165 ranges from about 50 degrees to about 100 degrees, and more preferably from about 65 degrees to about 80 degrees. As shown, the sector angle 268 is about 74 degrees. The width 269 of each ring spring 265 ranges from about 0.2 to about 0.8 millimeters; preferably from about 0.35 to about 0.70 millimeters. In one preferred embodiment, the width 269 is about 0.40 millimeters. The thickness of the ring springs 226 preferably ranges from about 0.15 millimeters to about 0.35 millimeters. In a preferred embodiment, the thickness is about 0.20 millimeters. In this embodiment, a width 271 of the pair of ring springs 265 ranges from about 6.5 to about 7.5 millimeters. In one preferred embodiment, the width 271 is about 7.0 millimeters. In this embodiment, length 272 of the ring springs 265 ranges from about 3.7 to about 4.5 millimeters, with a preferred embodiment having a length 272 of about 4.35 millimeters.

This embodiment also differs from the prior embodiment in that protrusion of a mounting area 262 of mounting region 261 into apertures 270 is generally less. Therefore, the distance 263 from the mounting area 262 to connecting member 264 is greater, ranging from about 2.8 millimeters to about 3.2 millimeters. As shown, the distance 263 is about 3.03 millimeters.

The ring spring variations described in this embodiment provide greater stroke or displacement because the ring springs are less stiff. Although the more compliant ring springs would normally cause a loss in frequency performance, use of a shorter load beam, such as the one illustrated in FIG. 20, counter balances these performance losses resulting in a head suspension having both higher stroke and acceptable frequency performance.

The microactuator 280, including microactuator motors 281 and 282, mounts to the hinge portion 212 within apertures 270 in a manner similar to that described above for the previous embodiment. The microactuator motors 281, 282 are electrically connected to the head suspension 250 by wire stitching, such as connection 283, from each microactuator motor 281, 282 to the traces 256 of the flexure 255. An electrical connection pad 257, similar to pad 84 described above, specifically positioned for connection 283 is preferably provided on the flexure 255.

As can be seen from the numerous embodiments described above, in addition to variations in the spring region, the mounting region of the base plate may also vary. In some embodiments, such as those shown in FIGS. 5, 12, 16 and 22, the mounting region may be formed in a generally 'L' shape. The angled portion, as represented by 87 in FIG. 5, may be used to support the tail portion of the flexure and traces. It may be positioned on either side of the center line 56, depending on the overall configuration of the head suspension and placement of the flexure traces. In other embodiments, such as those shown in FIGS. 18 and 21, the mounting region may be formed in a generally rectangular shape. In these embodiments, support for the flexure tail may be provided by an angled area of a hinge portion, such as 218 shown in FIG. 19. Alternatively, support for the flexure tail may be provided other support structure.

For the embodiments of the present invention shown and described above, a microactuator is mounted or otherwise attached to a head suspension base plate having a pair of motor springs. Preferably, the microactuator includes a pair of microactuating motors, as shown, but may include less or more than a pair of motors, if desired. Motor types usable with the present invention, include, but are not limited to, piezoelectric, electromagnetic, electrostatic, electrostrictive and/or thermoexpansive. In addition, both single layer and multiple layer motors, especially piezoelectric motors, can be used.

As set forth above, the motors may be mounted to the base plate on recessed tabs formed integrally with the base plate, on a surface of the base plate or on tabs provided by an additional member that is attached to the base plate (i.e., a hinge portion, for example). As stated above, the motors are preferably attached using adhesive. For base plate surface mounting, a lap shear joint is formed between each motor and the surface of the base plate, preferably with adhesive placed at the joint. This type of joint has a high reliability history and known characteristics for these types of uses. For inset tab mounting, a lap shear joint between the motor and the surface of the tab (such as tab 64 shown in FIG. 7) is formed, along with a butt end joint between the end of the motor and the side wall of the base plate at the tab (such as side wall 69, also shown in FIG. 7).

The use of recessed, integral tabs avoids the need to provide an additional layer of material to create mounting surfaces for the motors within the spring region, or the need to rely on the load beam or flexure to provide the necessary mounting surfaces. Shorter motors are placed upon the tabs of base plate material, which serve to provide a rigid motor attachment shelf integrated within the motor spring region itself. This minimizes chances for separation or fatigue over time of the adhesive joints between the compressive butt joint and the lap shear joints.

Preferably, the integral tabs are recessed to about a 50% remaining material thickness. As a result, these tabs do not require full insertion of the motors entirely within the plane of the base plate region, as would a tab formed from the flexure or load beam or formed from additional material, and the motors extend beyond the surface of the base plate a desired offset height. Such limited insertion is relatively easy for pick and place equipment. By not having to insert motors within a deep pocket, motor placement speed can be increased. Although, the lap shear joint to the tabs remains the primary attachment structure, additional advantages may be gained by the partial butt joint at the motor end face filled with adhesive, including use of compressive forces in addition to the shear forces, a stiffer motor/base plate structure, longer stroke and better tracking of base plate motion relative to motor expansion/contraction. In addition, the offset height lessens the likelihood that conductive adhesive at the butt joint might wick or flow to the top surface of the motor, thereby causing a short in the motor.

Recessed tabs formed from non-base plate material, such as those formed from the flexure or load beam, or those formed by the addition of other material, are also usable, as stated above. Tabs formed from the flexure or load beam may be etched, machined or otherwise formed in the material. Shorter motors placed upon the tabs of non-base plate material may be attached by both lap shear and butt end joints, with the lap shear joint between the motor and tab and the butt join between the motor end and side wall of the base plate (i.e., side wall 69 in FIG. 7). The tabs serve to provide full capture of the motor structure within the confines of the base plate material. In this fashion, the primary force transfer will be due to the compressive butt joints at the ends of the motors, with the lap shear joints to the tabs providing only functional capture of the motors.

The full end face compression butt joint requires critical placement of a dielectric isolation layer between the motors and the base plate, which may be provided by either non-conductive adhesive (glass ball filled, for example), or a conformal encapsulation coating of the motors themselves. Simple motor attachment with conductive adhesive will work best if the motor is encapsulated on all vertical faces and the top face, as well. This would leave only the bottom face free of encapsulate to provide conductive attachment to the tab with conductive adhesive, which thereby lessens concerns of shorting if the motor is encapsulated.

In either case, it is important in this method to provide full fill by adhesive of the vertical end face joint between the motors and the base plate to obtain good force transfer and thus displacement of the head suspension assembly for lateral stroke at the head. This may require a two step adhesive application process to do so, even with the non-conductive adhesive, wherein one step is to apply adhesive to the horizontal face of the tab at the lap shear joint and a second possible follow-on step is to top fill the vertical joints between the motors and the base material. If non-conductive adhesive is used for primary motor attachment (that is, no motor encapsulant is used), a third conductive adhesive or conductive paste application step will be required to short the bottom surface of the motor to the suspension stainless steel material at the base plate or hinge portion. Although it is preferred to adhere the recessed motors at the butt joint, only a lap shear joint may be used while still gaining protection from the recess into the base plate.

With either the integral tabs or the non-base plate tabs, the tabs can be positioned on the top or bottom surfaces of the head suspension to allow motor insertion from the head side or boss side of the assembly. Boss side placement of motor structures, that is on the side away from the disk, would still be favored for the advantages of additional wire stitch and motor clearance during vertical shock events so that the wires and motors won't run the risk of touching the disk in a shock event.

The third described option for motor placement and mounting is on a surface of the base plate. Such a configuration allows for longer motors and simplifies attachment through the use of only a lap shear joint, which reduces risks created by the more complex combinational adhesive joints described above. In addition, motor placement is made easier because it requires a relatively simple pick & place action onto a flat plane surface.

With any of the motor placement options, the gram load of the head suspension shared by the motors mounted in the base plate is generally lower than the motor load share of other microactuated head suspension designs. In addition, motor placement within the base plate in accordance with the present invention provides for more robust handling of the motors during head suspension assembly processes. Further, ease of motor placement with the different options as described facilitates motor insertion/application by head suspension vendors, instead of only the head suspension manufacturer. This is because resonant performance of a head suspension with or without secondary microactuation motors at the base plate changes very little. Thus, attachment of the microactuation motors after fabrication of the suspension is possible without adversely affecting the primary performance characteristics or requiring adjustments of the same.

If automated pick and place equipment is used to place motors in volume production, placement accuracy can approach ±50 micrometers or better. This being the case, Y-axis sidewise constraint features (protrusions 68) used optimally for manual or prototypical motor assembly operations may be redundant and unnecessary.

Another benefit of the present invention is the flexibility provided by the microactuator electrical connections and in the routing of the flexure traces with respect to the micro-actuator motors and other head suspension components. As shown in the first three embodiments, the traces of the flexure (such as traces 76 of flexure 75) are routed along the side of the head suspension and around the spring or radius region (such as 72, 156) of the load beam. The traces then pass through the spring region of the base plate. The mounting pad to which the microactuators are electrically connected via wire stitching (such as pad 84) is positioned within the ring springs (such as ring springs 55, 104). The circular shape of the motor springs provides a central open or void access region for the electrical connection in multiple positions and formats.

The overall configuration of the base plates also has advantages during the wire stitching process. Positioning the pads within the boundary of the motor springs helps protect the wire stitch pads for increased handling robustness. This positioning also has advantages for the wire stitch connection between the pad and the microactuators. By placing the pad within the spring boundary, the wire stitch does not have to pass over the ring spring, which may cause problems with shorting of the microactuator motors. In addition, a single, continuous, linear, in-line wire stitch simplifies the tooling and processing of a difficult and sensitive operation.

The traces of the head suspension may be routed on the side of the pad nearer the microactuators, such as shown with the traces of the first five embodiments. Alternatively, as shown in FIGS. 22 and 23, traces 410 of head suspension 400 may be routed on the opposite side of a pad 412 from a microactuator 414. These two different trace routing configurations provide for different polarities of the head slider, thereby readily accommodating end user needs. In addition, the traces of the flexure may be routed to either side of the base plate. In the first three embodiments shown in FIGS. 1, 8 and 13, the traces are routed to the "lower" side of the base plate, as viewed in the drawings. In the fourth and fifth embodiments shown in FIGS. 17 and 20, the traces are routed to the "upper" side of the base plate, as viewed in the drawings. These routing variations provide for variations in head slider mounting relative to the disk surface, such as top or bottom side, with the same base plate and similar, but mirrored flexure designs. Therefore, the present invention is more versatile to accommodate a larger variety of head suspension customer requirements.

Providing a method to route the traces of the flexure past the radius or spring region of the load beam along the side of the assembly rather than through the center of the radius results in a lower contribution to the vertical spring rate or stiffness of the suspension. Routing through the radius can compromise or increase spring rate by as much as 20%, though the advantages gained by central routing can decrease torsional bias from the flexure and improve processing by improving the flexure's nesting capability, thereby increasing the amount of flexures which can be produced from a given piece of material. With customers/users of the head suspension striving for lower vertical stiffness and internal processing needs demanding stainless steel (SST) backing throughout the flexure length, the trade-offs of side flexure routing are preferred and offer a more compliant structure through the suspension spring region resulting in lower variations or impacts upon the gram load of the head suspension. This is contrasted by the increasingly important resonant performance of head suspension assemblies which prefer central flexure routing through the suspension spring region to avoid asymmetries and off-track resonant modes. Design trade-offs for specific designs will usually dictate which path is taken.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A head suspension comprising:
   a mounting region for attachment of the head suspension to a source of primary actuation;
   a pair of generally arcuate ring springs at spaced locations extending from the mounting region with at least one aperture interposed between the pair of ring springs, each ring spring having sides that are substantially free from linear sections and oriented away from a longitudinal centerline of the head suspension and comprising and arc angle between about 30 degrees and 100 degrees; and
   a connecting member opposite the mounting region and spaced from the mounting region by the at least one aperture with the connecting member joining the pair of ring springs.

2. The head suspension of claim 1, further comprising at least one microactuator for secondary actuation of the head suspension, the at least one microactuator operationally mounted relative to the pair of ring springs.

3. The head suspension of claim 2, wherein the at least one microactuator is positioned to span the at least one aperture from the mounting region to the connection member.

4. The microactuated head suspension of claim 2, wherein the at least one microactuator includes at least two microactuators.

5. The head suspension of claim 2, wherein the at least one microactuator attaches to a top surface of the head suspension.

6. The head suspension of claim 2, wherein the at least one microactuator comprises a piezoelectric motor operatively connected to electrical elements of the head suspension.

7. The head suspension of claim 2, wherein the at least one microactuator comprises at least one of the group including piezoelectric, electromagnetic, electrostatic, electrostrictive and thermoexpansive motor elements.

8. A head suspension having first and second sections comprising:
   a pair of generally arcuate ring spring with at least one aperture interposed between the pair of ring springs, each ring spring having a circular section with a radius greater than about 1 millimeter with a center point on the head suspension, the ring springs providing for relative movement between the first and second sections of the head suspension, wherein the generally arcuate ring springs span the at least one aperture.

9. The head suspension of claim 8, wherein each ring spring comprises a positive radius between about 1 and about 4 millimeters.

10. The head suspension of claim 9, wherein each ring spring comprises a outer radius between about 1.5 and 3.0 millimeters.

11. The head suspension of claim 10, wherein each ring spring comprises a positive outer radius between about 1.8 and about 2.7 millimeters.

12. The head suspension of claim 8, wherein the ring springs each have a width between about 0.2 and 0.8 millimeters.

13. The head suspension of claim 12, wherein the width of each ring spring is between about 0.38 and 0.42 millimeters.

14. The head suspension of claim 13, wherein the width of each ring spring is between about 0.40 millimeters.

15. The head suspension of claim 8, wherein each ring spring is substantially free from linear portions.

16. The head suspension of claim 8, wherein each ring spring comprises an arc angle of less than about 100 degrees.

17. The head suspension of claim 16, wherein each ring spring comprises an arc angle between 30 degrees and 100 degrees.

18. The head suspension of claim 17, wherein each ring spring comprises an arc angle between 50 degrees and 90 degrees.

19. The head suspension of claim 18, wherein each ring spring comprises an arc angle between 65 degrees and 80 degrees.

20. The head suspension of claim 8, wherein the thickness of the ring springs ranges from about 0.15 millimeters to about 0.35 millimeters.

21. The head suspension of claim 20, wherein the thickness of the ring springs is about 0.20 millimeters.

22. The head suspension of claim 8, wherein the centers of the radii are at substantially the same point.

23. A head suspension comprising:
   a mounting region for attachment of the head suspension to a source of primary actuation;
   a pair of generally arcuate ring springs at spaced locations extending from the mounting region with at least one aperture interposed between the pair of ring springs;
   a connecting member opposite the mounting region and spaced from the mounting region by the at least one aperture with the connecting member joining the pair of ring springs, with each ring spring having sides that continuously curved from the mounting region to the connecting member and oriented away from a longitudinal centerline of head suspension; and a base plate region in which the pair of ring springs are formed, the base plate region including the mounting region, the connecting member and a plurality of mounting tabs projecting inward into the at least one aperture between the pair of ring springs, with the plurality of mounting tabs configured as at least two pairs of mounting tabs that are positioned opposite each other on either side of the at least one aperture with one pair of mounting tabs positioned on the mounting region and one pair of mounting tabs positioned on the connecting member, and wherein the head suspension comprises at least two microactuators each mounted to a pair of mounting tabs so as to span the at least one aperture.

24. The head suspension of claim 23, wherein the at least two pairs of mounting tabs are each formed to recess below a top surface of the base plate region, and wherein one microactuator is located in the recess of each pair of mounting tabs.

25. A head suspension comprising:

a mounting region for attachment of the head suspension to a source of primary actuation;

a pair of generally arcuate ring springs at spaced locations extending from the mounting region with at least one aperture interposed between the pair of ring springs;

a connecting member opposite the mounting region and spaced from the mounting region by the at least one aperture with the connecting member joining the pair of ring springs, with each ring spring having sides that are continuously curved from the mounting region to the connecting member and oriented away from a longitudinal centerline of the head suspension;

a base plate region in which the pair of ring springs are formed, the base plate region including the mounting region and the connecting member; and a separate multiple piece load beam attached to the base plate region, the multiple piece load beam including a rigid region and a load beam mounting region, the load beam mounting region including a radius section and a mounting section coupled to the radius section by an elongate spanning strip configured to extend a longitudinal dimemsion of the least one aperture.

26. The head suspension of claim 25, wherein the load beam mounting region further comprises a plurality of microactuator attachment tabs configured in aligned pairs extending into the at least one aperture with half the tabs formed on the mounting section and half of the tabs formed on the radius section.

27. The head suspension of claim 26, wherein the head suspension comprises a plurality of microactuators mounted on the pairs of attachment tabs so as to span the at least one aperture.

* * * * *

UNITED STATES PATENT AND TRADEMARK OFFICE
CERTIFICATE OF CORRECTION

PATENT NO. : 7,177,119 B1 Page 1 of 1
APPLICATION NO. : 10/012260
DATED : February 13, 2007
INVENTOR(S) : Jeffrey S. Bennin et al.

It is certified that error appears in the above-identified patent and that said Letters Patent is hereby corrected as shown below:

Column 13, line 55, delete "an" and insert -- and --

Column 14, line 16, delete "spring" and insert -- springs --

Column 14, line 24, delete "a positive" and insert -- an outer --

Column 14, line 30, delete "a positive" and insert -- an --

Column 15, line 2, after "that", insert --are --

Signed and Sealed this

Twenty-second Day of May, 2007

JON W. DUDAS
*Director of the United States Patent and Trademark Office*